United States Patent
Peng et al.

(10) Patent No.: US 9,307,039 B2
(45) Date of Patent: Apr. 5, 2016

(54) METHOD, SYSTEM, PUSH CLIENT, AND USER EQUIPMENT FOR SERVICE COMMUNICATION

(71) Applicant: Huawei Technologies Co., Ltd., Shenzhen (CN)

(72) Inventors: Chenghui Peng, Shanghai (CN); Wei Zhang, Shanghai (CN); Yuhua Chen, Shanghai (CN); Bojie Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 470 days.

(21) Appl. No.: 13/741,224

(22) Filed: Jan. 14, 2013

(65) Prior Publication Data
US 2013/0173757 A1  Jul. 4, 2013

Related U.S. Application Data

(63) Continuation of application No. PCT/CN2011/074197, filed on May 17, 2011.

(30) Foreign Application Priority Data

Jul. 14, 2010 (CN) .......................... 2010 1 0226151

(51) Int. Cl.
G06F 15/16 (2006.01)
H04L 29/08 (2006.01)
H04L 12/18 (2006.01)

(52) U.S. Cl.
CPC ............ *H04L 67/26* (2013.01); *H04L 12/1859* (2013.01); *Y02B 60/46* (2013.01)

(58) Field of Classification Search
CPC ............ H04L 12/581–12/582; H04L 12/1859; H04L 29/08693; H04L 67/26
See application file for complete search history.

(56) References Cited

U.S. PATENT DOCUMENTS 6,765,920 B1 * 7/2004 Tari et al. ...................... 370/401
7,711,853 B2 * 5/2010 Horton et al. ................ 709/245

(Continued)

FOREIGN PATENT DOCUMENTS

CN        1647559 A      7/2005
CN      101262497 A      9/2008

(Continued)

OTHER PUBLICATIONS

Communication from a foreign counterpart application, International Application No. PCT/CN2011/074197, English Translation, International Search Report dated Aug. 25, 2011, 3 pages.

(Continued)

*Primary Examiner* — Brendan Higa
(74) *Attorney, Agent, or Firm* — Conley Rose, P.C.; Grant Rodolph; Nicholas K. Beaulieu

(57) ABSTRACT

The present invention discloses a method, a system, a Push client, and a user equipment for service communication. The method disclosed in the present invention includes that: A source Push client generates a Push message, where the Push message carries a destination user Push identifier for identifying a destination user; the source Push client sends the Push message to a destination Push server to which the destination user belongs; the destination Push server obtains, according to the destination user Push identifier, a network address for reaching a destination Push client; and the destination Push server sends, based on the network address, the Push message to the destination Push client. With the present invention, communication of various services can be established without relying on a third party application server, which can reduce power consumption of a terminal and save network resources.

27 Claims, 14 Drawing Sheets

(56) References Cited

U.S. PATENT DOCUMENTS

| | | |
|---|---|---|
| 8,544,080 B2* | 9/2013 | Arauz Rosado ............... 726/15 |
| 2003/0208602 A1 | 11/2003 | Bhalla et al. |
| 2004/0148356 A1* | 7/2004 | Bishop et al. ............... 709/206 |
| 2004/0192272 A1* | 9/2004 | Seo .................. H04M 1/72522 455/414.1 |
| 2004/0214570 A1* | 10/2004 | Zhang et al. ............... 455/426.2 |
| 2005/0044144 A1* | 2/2005 | Malik et al. ............... 709/205 |
| 2007/0264982 A1* | 11/2007 | Nguyen et al. ............ 455/414.1 |
| 2010/0069044 A1 | 3/2010 | Lee |
| 2010/0077023 A1* | 3/2010 | Eriksson ..................... 709/203 |
| 2010/0083125 A1* | 4/2010 | Zafar et al. .................. 715/739 |
| 2010/0124191 A1 | 5/2010 | Vos et al. |
| 2010/0312844 A1* | 12/2010 | Katis et al. .................. 709/206 |
| 2014/0040383 A1* | 2/2014 | Dura et al. .................. 709/206 |

FOREIGN PATENT DOCUMENTS

| | | |
|---|---|---|
| CN | 101309162 A | 11/2008 |
| CN | 101340454 A | 1/2009 |

OTHER PUBLICATIONS

Foreign Communication From A Counterpart Application, Chinese Application 201010226151.0, Chinese Office Action dated Apr. 8, 2013, 5 pages.

Foreign Communication From A Counterpart Application, Chinese Application 201010226151.0, Partial Translation of Chinese Office Action dated Apr. 8, 2013, 5 pages.

Foreign Communication From A Counterpart Application, PCT Application PCT/CN2011/074197, English Translation Written Opinion, dated Aug. 25, 2011, 4 pages.

* cited by examiner

US 9,307,039 B2

METHOD, SYSTEM, PUSH CLIENT, AND USER EQUIPMENT FOR SERVICE COMMUNICATION

CROSS-REFERENCE TO RELATED APPLICATIONS

This application is a continuation of International Application No. PCT/CN2011/074197, filed on May 17, 2011, which claims priority to Chinese Patent Application No. 201010226151.0, filed on Jul. 14, 2010, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to a digital communication system, and in particular, to a method, a system, a Push client, and a user equipment for service communication in a digital communication system.

BACKGROUND

On the current Internet, communication between terminals, between network elements, and between a terminal and a network element need to be performed by using Internet Protocol (IP) addresses. From the perspective of a function of an IP address, the IP address has double semantics: In terms of network topology, the IP address indicates a topological location of a terminal when the terminal accesses a network; in terms of application, the IP address represents the identity of the terminal.

When a first terminal and a second terminal are performing service communication, they know each other's IP addresses. If the first terminal moves, the topological location where it gets access to the network also changes, and its IP address needs to change accordingly. However, the second terminal cannot know the change of the IP address of the first terminal. For the second terminal, it always deems that an IP address known by it corresponds to the first terminal. This causes the interruption of the service communication and affects the communication experience between users.

To solve a problem of communication interruption caused by the problem of the double semantics of the IP address, in the prior art, a manner relying on a third party application server is adopted to solve a problem of continuous communication between users. Two terminals expecting to establish communication may be connected through the third party application server, and the third party application server performs service message forwarding between the two terminals. One of the two terminals expecting to establish communication may also obtain the IP address of the other terminal from the application server and then perform the communication. The third party application server is generally provided by a service provider and includes but is not limited to instant messaging (IM), Twitter, electronic mail (Email), Tencent QQ instant messaging (QQ), and so on.

A communication process relying on the third party server is briefly described as follows: A user registers on the application server and obtains an identifier of the application server, that is, the user obtains an identifier from the application server, for example, a QQ number; the user logs in to the application server by using the application identifier, and the application server obtains an IP address of the user; when another user needs to contact the user, the IP address of the user is obtained through forwarding by the application server or directly from the application server, so as to establish communication; the application server needs a periodic application heartbeat to maintain IP reachability of the user, where the period is determined according to an actual situation and generally ranges from one minute to more than ten minutes. In communication relying on the third party application server, a Push technology may be used. The third party application server is used to push a message to a terminal user who maintains the IP reachability by using a heartbeat mechanism.

The communication manner relying on the third party application server restrains conditions for communication between two communication parties. First, users of both parties should actively initiate communication with the third party application server to maintain the IP reachability with the third party application server; otherwise, the third party application server cannot find the users; second, without the third party application server, the communication between the two communication parties is difficult to start or continue; third, to rely on the third party application server, a user terminal should enable an application client and keep it online all the time, which increases the power consumption of the terminal and reduces the performance of the terminal.

SUMMARY

Therefore, a technical problem to be solved in embodiments of the present invention is to provide a method, a system, a Push client, and a user equipment for service communication, so that two communication parties can push service messages to each other without relying on a third party application server, which can reduce power consumption of a terminal and save network resources.

To solve the foregoing technical problem, in one aspect, an embodiment of the present invention provides a method for service communication. The method includes: generating, by a source Push client, a Push message, where the Push message carries a destination user Push identifier for identifying a destination user; sending, by the source Push client, the Push message to a destination Push server to which the destination user belongs; obtaining, by the destination Push server and according to the destination user Push identifier, a network address for reaching a destination Push client; and sending, by the destination Push server and based on the network address, the Push message to the destination Push client.

In another aspect, an embodiment of the present invention provides a system for service communication. The system includes: a source Push client, a destination Push client, and a destination Push server. The source Push client generates a Push message, where the Push message carries a destination user Push identifier for identifying a destination user; the source Push client sends the Push message to the destination Push server to which the destination user belongs; the destination Push server obtains, according to the destination user Push identifier, a network address for reaching the destination Push client; and the destination Push server sends, based on the network address, the Push message to the destination Push client.

In still another aspect, an embodiment of the present invention provides a Push client for service communication. The Push client includes: a generating module configured to generate a Push message, where the Push message carries a destination user Push identifier for identifying a destination user; and a sending module configured to send the Push message, generated by the generating module, to a destination Push server to which the destination user belongs, so that the destination Push server obtains, according to the destination user Push identifier, a network address for reaching a destination Push client, and the destination Push server sends, based on the network address, the Push message to the destination Push client.

In still another aspect, an embodiment of the present invention provides a user equipment for service communication. The user equipment includes the foregoing Push client.

Based on the foregoing technical solutions, in the embodiments of the present invention, address translation is performed according to a destination user Push identifier carried in a Push message, to find a destination user, so that communication between a source user and the destination user can be completed according to the Push identifier, without involving a third party application server. Therefore, in the embodiments of the present invention, communication of various services can still be established without relying on a third party application server, so that a user avoids keeping an application online all the time or querying the server periodically, and meanwhile, still can obtain, in real time, a message or content sent by a peer end of the communication. Therefore, in the embodiments of the present invention, the power consumption of a terminal can be reduced and the network resources can be saved.

BRIEF DESCRIPTION OF THE DRAWINGS

To illustrate technical solutions in embodiments of the present invention more clearly, accompanying drawings to be used for describing the embodiments are introduced briefly in the following. Apparently, the accompanying drawings in the following description are only some embodiments of the present invention, and those skilled in the art can derive other drawings from these accompanying drawings without making creative efforts.

DETAILED DESCRIPTION

Figure 1:
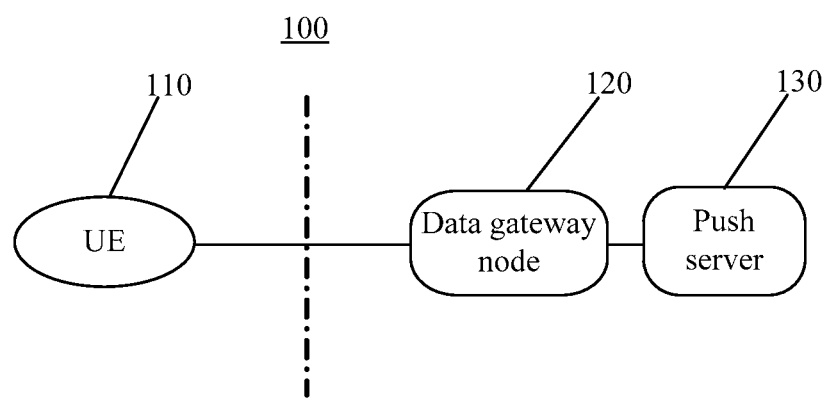
FIG. 1 is a schematic diagram of network architecture according to an embodiment of the present invention.

In order to make the objectives, technical solutions, and advantages of embodiments of the present invention more clear, the technical solutions in the embodiments of the present invention are clearly and completely described in the following with reference to accompanying drawings. Apparently, the embodiments in the following description are part rather than all of the embodiments of the present invention. All other embodiments obtained by persons of ordinary skill in the art based on the embodiments of the present invention without creative efforts fall within the protection scope of the present invention.

First, network architecture 100 that can be applied in the embodiments of the present invention is described with reference to FIG. 1.

The network architecture 100 of the present invention may include a user terminal 110 (e.g., user equipment (UE)), a data gateway node 120, and a Push server 130. Each element may be an independent network entity or a functional entity integrated in a network entity.

In the user terminal 110, a Push client is installed and configured to perform peer-to-peer communication with the Push server 130. After the user terminal 110 accesses the network, the Push client may initiate registration with the Push server 130, and exchange Push messages with the Push server 130, and may not only send a Push message to the Push server 130 but also receive a message from the Push server 130.

In the user terminal 110, an application client may also be installed and configured to generate service information expected to be sent. The application client sends the generated service information to the Push client to generate a Push message.

The data gateway node 120 may be an access device accessing a data network, and includes but is not limited to a gateway general packet radio service (GPRS) support node (GGSN), a home agent (HA), a packet data network gateway (PDN-GW), and so on. The data gateway node 120 may allocate a network address (for example, an IP address) to a user. The user terminal 110 may access the data network through the data gateway node 120.

The Push server 130 may be a newly added network element in the network, and may also be a functional entity integrated in an existing network element. The Push server 130 may store a mapping relationship between a user Push identifier and a network address of a user terminal, translate the user Push identifier into a current network address of the user terminal, and send a Push message to a corresponding user terminal. The Push server may further authenticate the Push message to ensure that the Push message is legally pushed.

The Push server 130 is generally located in a packet switched domain of a wireless network, where the wireless network includes but is not limited to wireless networks such as second-generation wireless telephone technology (2G), GPRS, third-generation wireless telephone technology (3G), Worldwide Interoperability for Microwave Access (WiMAX), and Long Term Evolution (LTE). The Push server 130 stores a mapping relationship between the user Push identifier and a location of the user terminal (for example, network addresses), and has a function of translating the user Push identifier into a current address with which the user terminal can be reached. In addition, if the Push server 130 is located in a circuit switched domain, the Push server 130 maintains a mapping relationship between the user Push identifier and a user intra-network identifier (for example, an international mobile subscriber identifier (IMSI)), and has a function of translating the user Push identifier into the intra-network identifier of the user (for example, the IMSI).

Figure 2:
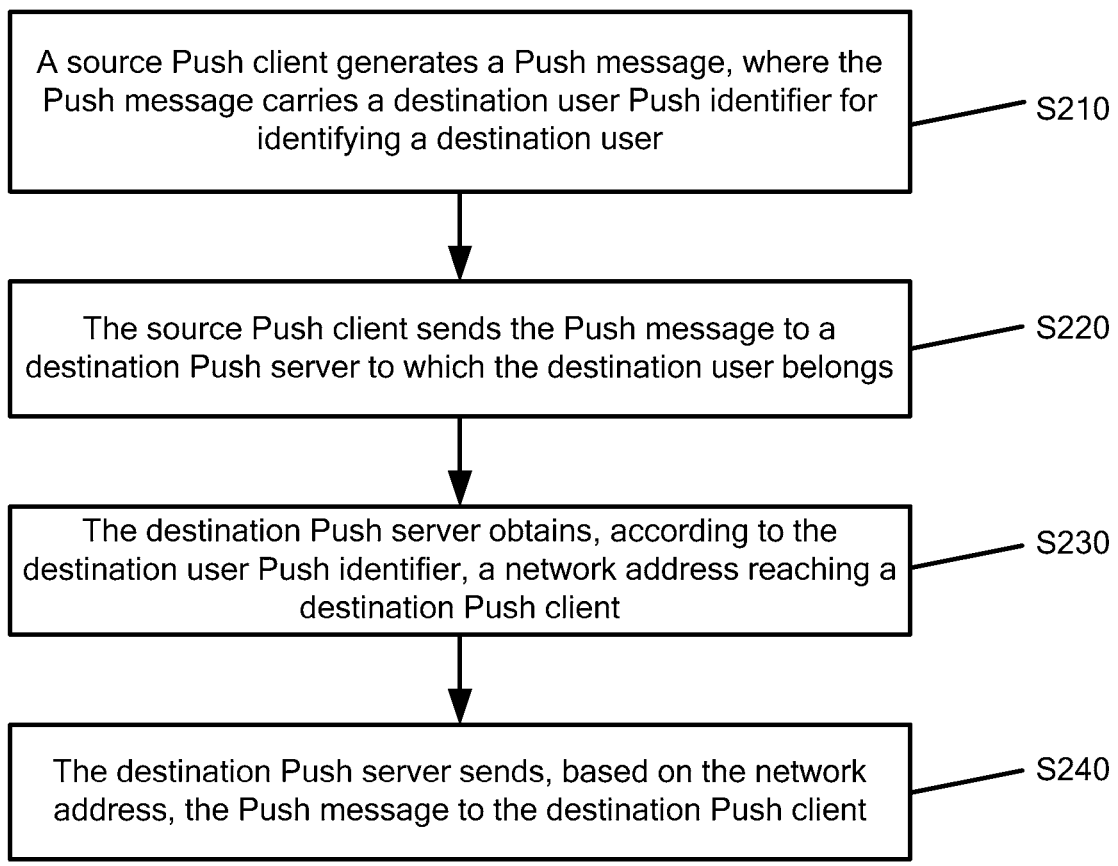
FIG. 2 is a schematic flowchart of a method for service communication according to an embodiment of the present invention.

FIG. 2 is a schematic flowchart of a method for service communication 200 according to an embodiment of the present invention. As shown in FIG. 2, the method for service communication 200 according to the embodiment of the present invention includes:

S210. A source Push client generates a Push message, where the Push message carries a destination user Push identifier for identifying a destination user.

S220. The source Push client sends the Push message to a destination Push server to which the destination user belongs.

S230. The destination Push server obtains, according to the destination user Push identifier, a network address for reaching a destination Push client.

S240. The destination Push server sends, based on the network address, the Push message to the destination Push client.

The source Push client as a message sender generates a Push message sent to the destination Push client as a message receiver. The Push message may carry, in addition to service information, the destination user Push identifier for identifying the destination user. The source Push client may send the generated Push message to the destination Push server to which the destination Push belongs. Because the destination Push server stores a mapping relationship between the destination user Push identifier and a destination user network address, for example, a mapping table between the Push identifier and an IP address of the user, the destination Push server may perform a query according to the destination user Push identifier carried in the Push message, and obtain the network address of the destination Push client. After obtaining the network address, the destination Push server may send, according to the network address, the Push message via a corresponding port, so that the Push message finally reaches the destination Push client of the destination user.

In the method for service communication provided by the embodiment of the present invention, an address query is performed according to the destination user Push identifier carried in the Push message, to find the destination user, so that communication between a source user and the destination user can be completed by using the Push identifier, without involving a third party application server. Therefore, in the embodiment of the present invention, communication of various services can still be established without relying on a third party application server, so that a user avoids keeping an application online all the time or querying the server periodically, and meanwhile, still can obtain, in real time, a message or content sent by a peer end of the communication. Therefore, in the embodiment of the present invention, the power consumption of the terminal can be reduced and network resources can be saved.

In the embodiment of the present invention, that the source Push client sends a Push message to the destination Push server to which the destination user belongs not only includes that the source Push client directly sends the Push message to the destination Push server of the destination user, but also includes that the source Push client has the Push message indirectly forwarded through a source Push server to the destination Push server, which depends on whether the source Push client of the source user and the destination Push client of the destination user belong to a same Push server and whether the users are located in a roaming place, where the source Push server may include a Push server to which the source user belongs, but also a roaming domain Push server in a roaming domain where the source user is located.

That is, in a case where neither the source user nor the destination user roams:

In one aspect, if the source Push client of the source user and the destination Push client of the destination user belong to a same Push server, the Push server is not only the source Push server to which the source user belongs, but also the destination Push server to which the destination user belongs. In this case, a system for implementing the method for service communication includes a source Push client, a destination Push client, and a Push server, and the method for service communication is as follows: The source Push client generates a Push message that carries a destination user Push identifier; the source Push client directly sends the Push message to the Push server, where the Push server is not only a Push server to which the source user belongs, but also a Push server to which a destination user belongs; the Push server performs a query according to the destination user Push identifier, and obtains a network address for reaching the destination Push client, and sends, based on the network address, the Push message to the destination Push client.

In another aspect, if the source Push client of the source user and the destination Push client of the destination user do not belong to a same Push server, the source Push client may directly send the Push message to the destination Push server to which the destination user belongs, under a condition that the source Push client already knows an address of the destination Push server in advance, or obtains the address of the destination Push server according to the destination user Push identifier; the source Push client may also have the Push message forwarded to the destination Push server indirectly through the source Push server to which the source user belongs. Details are illustrated in the embodiment shown in FIG. 3.

Figure 3:
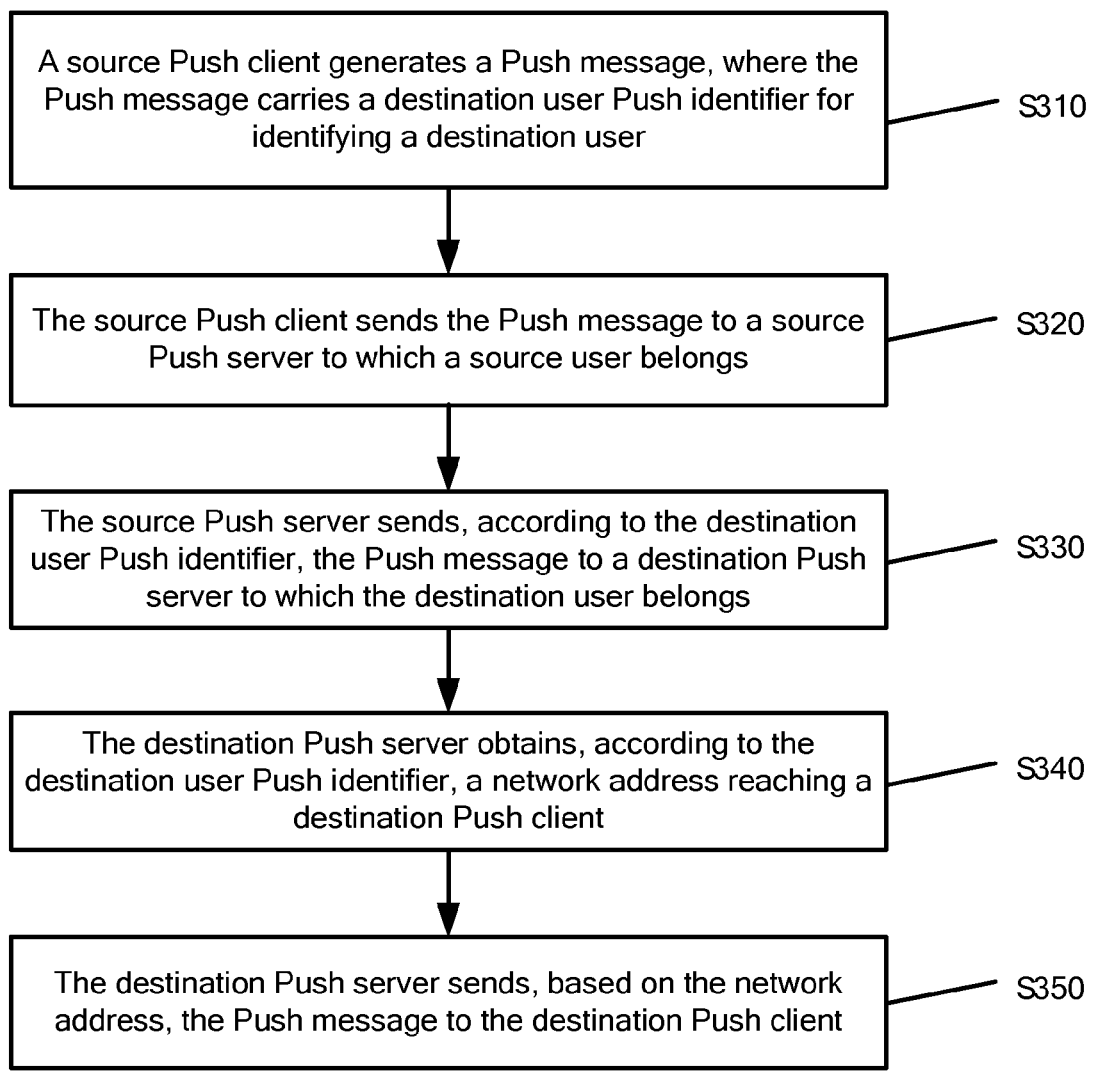
FIG. 3 is a schematic diagram of another method for service communication according to an embodiment of the present invention.

As shown in FIG. 3, in a method for service communication 300 according to another embodiment of the present invention, in a case where a source Push server to which a source user belongs is different from a destination Push server to which a destination user belongs, and both the source user and the destination user do not roam, step S220 in FIG. 2 may include:

S320. A source Push client sends a Push message to the source Push server to which the source user belongs.

S330. The source Push server sends, according to a destination user Push identifier, the Push message to the destination Push server to which a destination user belongs.

That is, after the source Push client generates a Push message, for example, based on service information that the source user expects to send to the destination user (S310), where the Push message carries the destination user Push identifier for identifying the destination user, the source Push client first sends the Push message to the source Push server to which the source user belongs (S320); the source Push server may determine, according to the destination user Push identifier, that the destination Push server to which the destination user belongs is different from the source Push server, and then, the source Push server may send, according to the destination user Push identifier, the Push message to the destination Push server to which the destination user belongs (S330); the destination Push server performs a query according to the destination user Push identifier, obtains a network address for reaching a destination Push client (S340), and sends, based on the network address, the Push message to the destination Push client of the destination user (S350).

According to the method for service communication provided by the embodiment of the present invention, an address query is performed according to the destination user Push identifier carried in the Push message, to find the destination user, so that communication between the source user and the destination user can be completed by using the Push identifier, without involving a third party application server. Therefore, in the embodiment of the present invention, communication of various services can still be established without relying on a third party application server, so that a user avoids keeping an application online all the time or querying the server periodically, and meanwhile, still can obtain, in real time, a message or content sent by a peer end of the communication. Therefore, in the embodiment of the present invention, the power consumption of the terminal can be reduced and network resources can be saved.

In the embodiment of the present invention, the source Push client may generate a Push message, based on service information received from an application client, where the application client may be an application client having a Push interface for communication with the source Push client. Compared with an existing ordinary application client, the application client has a Push function added, that is, it can communicate with the source Push client. Therefore, the application client involved in the embodiment of the present invention may also be referred to as an enhanced application client. Specifically, the enhanced application client may include one or more of the following cases:

1. Enhanced Rich Communication Suite (RCS). A current RCS may provide a user with a whole set of online communication applications based on an address book, such as presence, instant messaging, group chatting, and file transfer. That is, the RCS may integrate multiple third party applications in the address book of the user. The user can select, through an RCS interface only, any one of the third party applications already integrated into the RCS to contact and communicate with a friend in the address book. The enhanced RCS has a Push interface integrated into the current RSC, so that all third party applications integrated into the RCS may be implemented based on the method for service communication by using the Push identifier provided by the present invention. The enhanced RCS may choose to communicate with the Push client to push messages in a Push manner.

2. Enhanced address book. A function of a current ordinary address book is enhanced, so that the address book can support translation between a user Push identifier and a friend (a friend means information of a friend). The user Push identifier may be translated into at least one of a user name of the friend, a phone number of the friend, and an address of the friend. In the enhanced address book obtained by integrating the Push interface into the address book, a message may be sent to the friend through a Push interface, and conversely, a Push client may query the address book to obtain the name of the friend. In this case, two communication parties perform communication by directly using address books in terminal devices, without logging in to a third party application (a friend means information of a friend).

3. Enhanced third party application client software. The enhanced third party application client software has a Push function added on the basis of an ordinary client (for example, Microsoft Network (MSN) and QQ client software), to implement communication between a Push client and a third party application client. In this case, the application client does not need to interact with a third party application server before initiating a service, that is, does not need to obtain user information before communicating with a peer end (for example, a QQ user needs to log in to a QQ server before communicating with a peer end), but can perform direct communication with the peer end by obtaining a destination user Push identifier. The direct communication mentioned in this document refers to communication without relying on the third party application server.

4. Proxy client software. When application client software cannot support a Push function, that is, cannot have a Push interface integrated into the application client, the proxy client software helps the application client to perform information exchange with a Push client. In this case, the proxy client may be equivalent to a Push interface between the application client and the Push client. From the perspective of the Push client, the proxy client may be equivalent to an enhanced application client.

After receiving the service information from the application client enhanced with the Push function, the source Push client may generate a Push message to be sent to the destination user. In the embodiment of the present invention, the Push message carries a source user Push identifier for identifying the source user and/or an application identifier for identifying a service type, in addition to the service information and the destination user Push identifier for identifying the destination user.

Both the destination user Push identifier and the source user Push identifier are user Push identifiers. A user Push identifier may be an identifier that corresponds to the user and is at the application layer, and are used for differentiating between different users. The user Push identifier is unique in a network, and the corresponding user can be found through the user Push identifier. The user mentioned herein may be an actual user who operates a user terminal, and may also be a virtual user who is in the cyber world and is identified by a user name, a code, a number, and so on, and may also correspond to a specific terminal device. In a word, the user is a communication object that can be uniquely identified by using a Push identifier. Therefore, the user Push identifier may include, for example, a user phone number, a user name, a user code, and a user number used to differentiate different users. The user Push identifier may be mapped to a friend (a friend means information of a friend) shown in an RCS, an address book, or an application client in a user terminal. By selecting a friend, a Push identifier of this friend can be obtained. The user Push identifier is allocated by an operator, specifically, may be allocated by a Push server deployed in the network, may also be allocated by other functional entities in the network (for example, an Authentication, Authorization, Accounting (AAA) server), and may also be allocated by a network operator by executing a subscription procedure. The user Push identifier may be a static and long-term identifier, and may also be a dynamic and short-term identifier. The user Push identifier may be a binary bit string, and may also be a character string for identifying the user.

The application identifier may point to a specific application, and may also indicate a type of application needed for viewing, reading, and operating service information, and may also describe a content attribute of the service information. Certainly, the application identifier may also be other data that can be thought of by those skilled in the art and can indicate a mapping relationship between the service information and the application. The application identifier may be generated based on actively applying by an application. When a certain application actively applies for an application identifier, the application applies to a provider who deploys a Push server, expecting to obtain an application identifier for this application. After examination and approval are passed, the provider configures a rule for the application on the Push server, and allocates an application identifier to the application. The application identifier may also be generated based on a requirement of the provider who deployed the Push server. The provider may send an invitation to a certain application; in a case that the application consents, the provider configures a rule for the application on the Push server, and allocates an application identifier to the application. That is, the application identifier is determined in advance and there is a corresponding sending rule on the Push server. The sending rule may be sending after authentication is passed, may also be sending with priority, and may also be sending with a minimum delay, and so on.

According to the embodiment of the present invention, to obtain at least one of the destination user Push identifier, the source user Push identifier, and the application identifier, the following obtaining method may be used. The following obtaining method is described with an example that a source end obtains the destination user Push identifier. A process that the source end obtains the source user Push identifier and the application identifier and a process that a destination end obtains at least one identifier of the three identifiers are similar to this method.

In the embodiment of the present invention, according to a different storage location of correspondence between a user name of a user and a user Push identifier, a different manner may be used to obtain the user Push identifier, where the storage location of the correspondence may include the following three cases:

1. Located in a configuration file or database of a user terminal. The configuration file or the database may be a configuration file or database specially used to record the correspondence, and may also be a configuration file or database obtained after the correspondence is added on the basis of an existing configuration file or database.

2. Located in an application client or an RCS or an address book. The user Push identifier corresponding to the user name of the user is stored and managed in association with the user name.

3. Located in a network of an operator. The correspondence may be stored in a terminal address book, where the terminal address book may be a functional module integrated in a specific network element, and may also be an independent network element, and the terminal address book records the correspondence between the user name and the user Push identifier.

In addition, according to the different storage location of the correspondence, the user Push identifier may also be obtained by a different entity (for example, the application client, the Push client, or the Push server). A detailed description is provided in the following.

Figure 4:
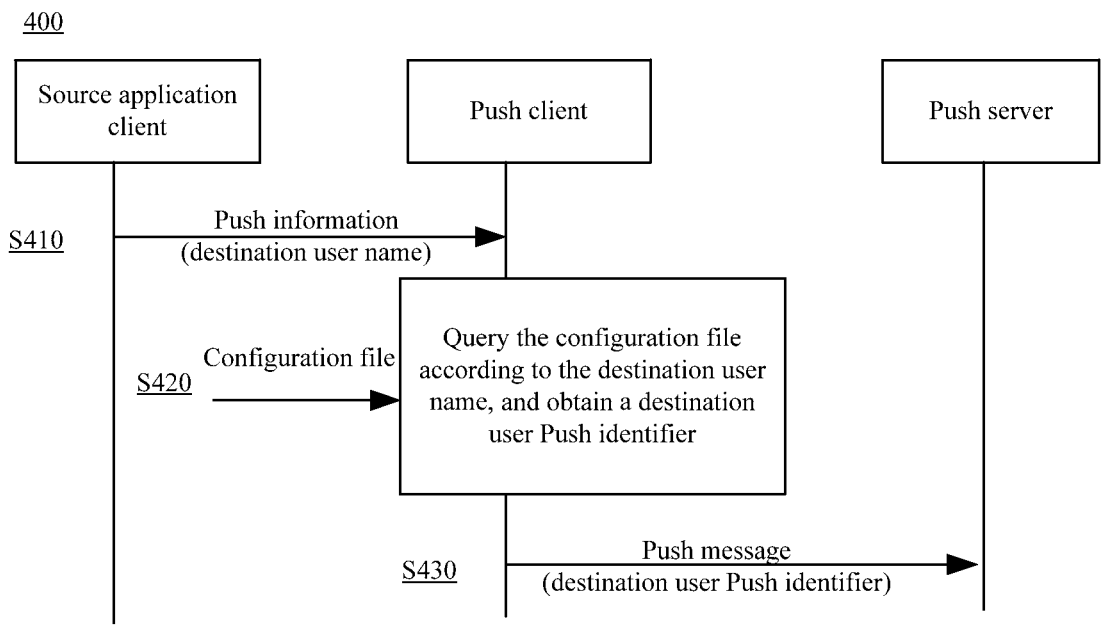
FIG. 4 is a schematic diagram of a method for obtaining a destination user Push identifier by a source Push client according to an embodiment of the present invention.

FIG. 4 is a schematic diagram of a method 400 for obtaining a destination user Push identifier by a source Push client according to an embodiment of the present invention.

In S410, a source application client may send the source Push client service information, that is, Push information carrying service data. The Push information may also carry a user name of a destination user. For example, what sends the Push information to the source Push client is an application corresponding to an address book. The user name of the destination user may be obtained through a query by the source application client in the address book, and the user name is not limited to a name of the user and may also be a phone number of the user, a code of the user, a nickname of the user, and an address of the user.

In S420, the source Push client queries a configuration file in a source user terminal according to the user name of the destination user, and obtains the destination user Push identifier. The configuration file may record the mapping relationship between the user name of the destination user and the destination user Push identifier. In S430, the source Push client generates a Push message on the basis of the Push information and based on the obtained destination user Push identifier, and sends the Push message to a source Push server. For example, the source Push client may add the destination user Push identifier to a header of the Push information, and may also add the destination user Push identifier to a retained or reserved field in the Push information, and through selection by the Push client, other Push information sent by the source application client may also be filled in the generated Push message.

Figure 5:
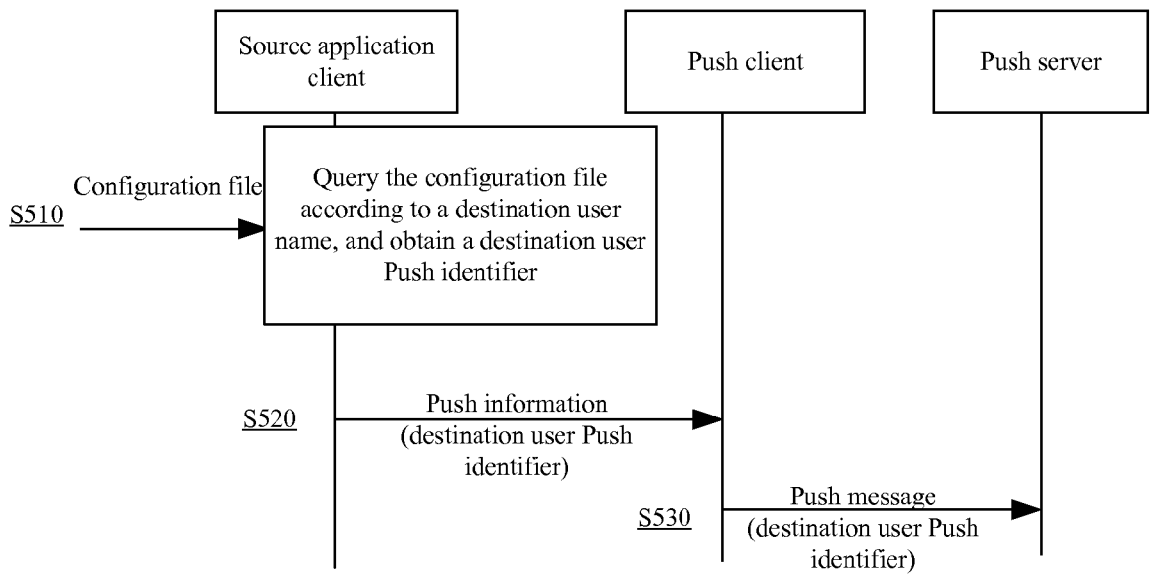
FIG. 5 is a schematic diagram of a method for obtaining a destination user Push identifier by a source application client according to an embodiment of the present invention.

FIG. 5 is a schematic diagram of a method 500 for obtaining a destination user Push identifier by a source application client according to an embodiment of the present invention.

In S510, the source application client may query a configuration file according to a user name of a destination user, to obtain the destination user Push identifier. The configuration file may be a file that records a mapping relationship between the user name of the destination user and the destination user Push identifier and is stored in a source user terminal.

In S520, the source application client generates Push information carrying the destination user Push identifier, and sends the Push information to a source Push client. In S530, the source Push client generates, based on the Push information, a Push message that carries the destination user Push identifier, and sends the Push message to a Push server. For example, the source Push client may directly use the Push information, carrying the Push identifier of the destination end (that is the destination user Push identifier), as the Push message. The source Push client may also convert the data structure of the Push information into a form complying with the data structure of the Push message.

Figure 6:
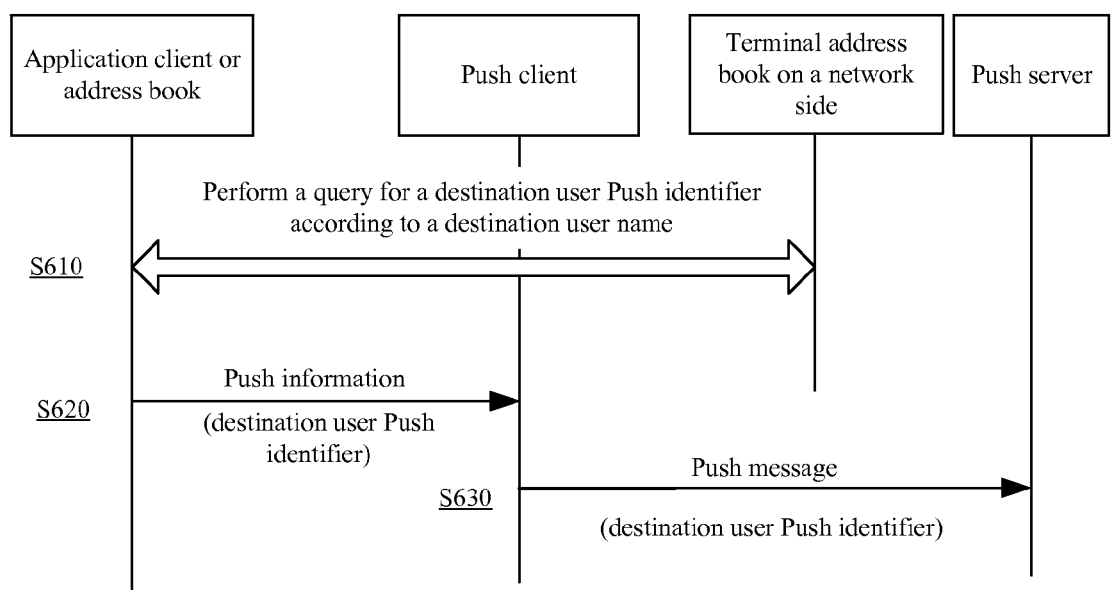
FIG. 6 is a schematic diagram of another method for obtaining a destination user Push identifier by a source application client according to an embodiment of the present invention.

FIG. 6 is a schematic diagram of another method 600 for obtaining a destination user Push identifier by a source application client according to an embodiment of the present invention.

In S610, the source application client may query, according to a user name of a destination user stored in an address book, a terminal address book stored on a network side for the destination user Push identifier corresponding to the user name, where the terminal address book may store a mapping relationship between a user name and a user Push identifier in a centralized manner.

In S620, the source application client generates Push information based on the destination user Push identifier obtained through the query, and sends the Push information to a source Push client.

In S630, the source Push client generates, based on the Push information, a Push message that carries the destination user Push identifier, and sends the Push message to a Push server.

Figure 7:
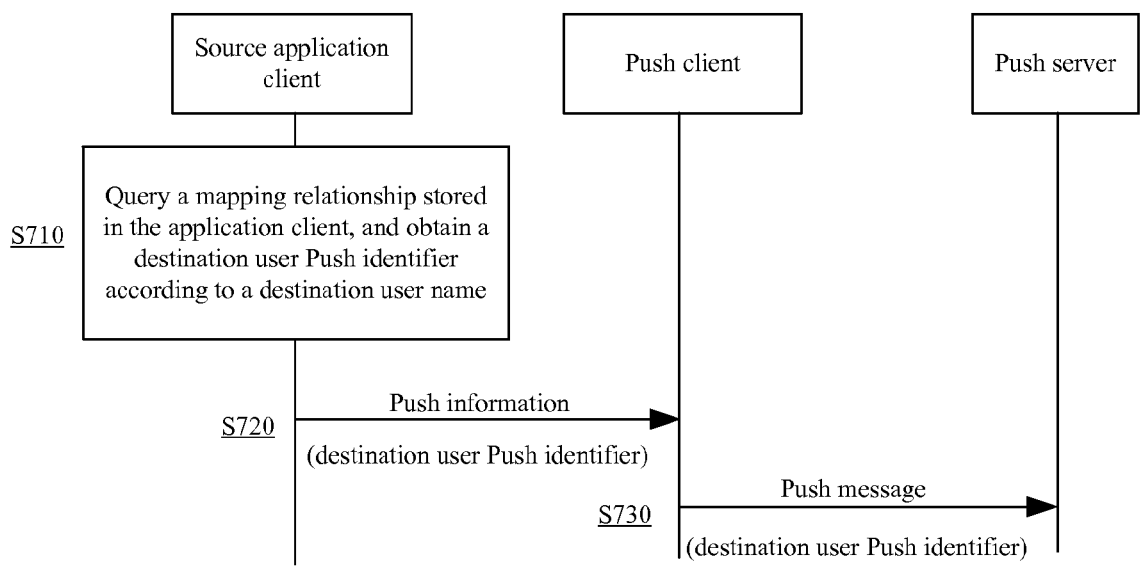
FIG. 7 is a schematic diagram of still another method for obtaining a destination user Push identifier by a source application client according to an embodiment of the present invention.

FIG. 7 is a schematic diagram of still another method 700 for obtaining a destination user Push identifier by a source application client according to an embodiment of the present invention.

In S710, the source application client queries a mapping relationship that is between a destination user (that is a user name of a destination user) and the destination user Push identifier and is stored in the source application client or an address book, and obtains the destination user Push identifier according to the user name of the destination user.

In S720, the source application client carries the destination user Push identifier in Push information, and sends the Push information to a source Push client.

In S730, the source Push client carries, in a Push message, the destination user Push identifier from the source application client, and sends the Push message to a Push server.

Figure 8:
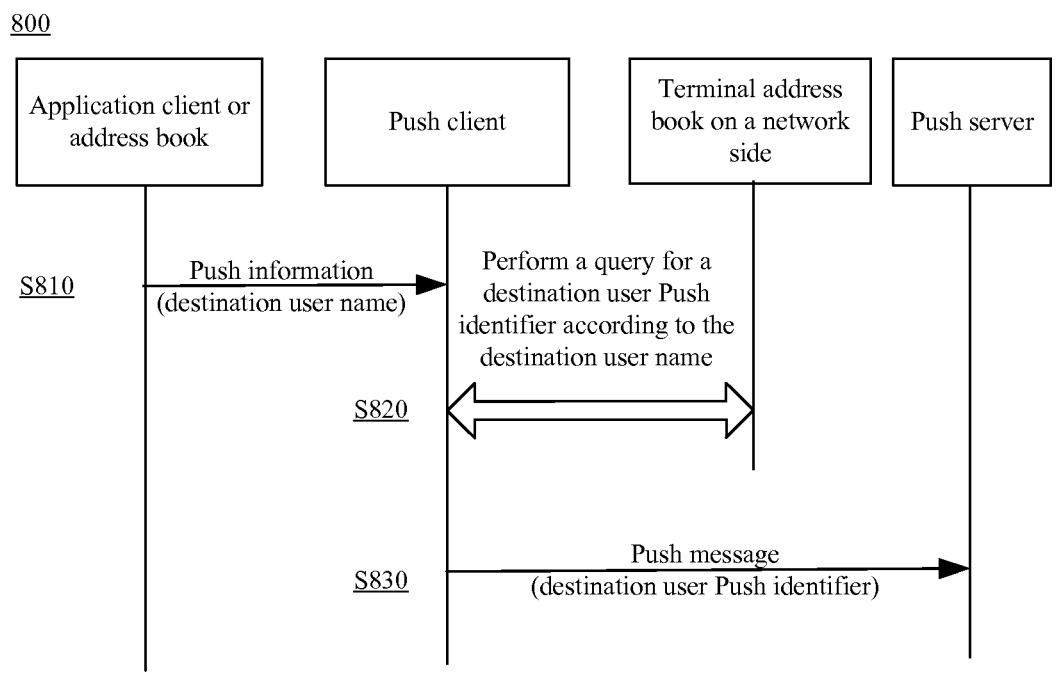
FIG. 8 is a schematic diagram of another method for obtaining a destination user Push identifier by a source Push client according to an embodiment of the present invention.

FIG. 8 is a schematic diagram of another method 800 for obtaining a destination user Push identifier by a source Push client according to an embodiment of the present invention.

In S810, a source application client sends Push information to the source Push client, where the Push information carries a user name of a destination user, where the user name may be obtained by the source application client by querying an address book, and the user name is not limited to a name of a user, and may also be a phone number of the user, a code of the user, a nickname of the user, and an address of the user.

In S820, the source Push client queries, for the destination user Push identifier and according to the user name of the destination user, a terminal address book that is on a network side. The terminal address book may store a mapping relationship between a user name and a user Push identifier.

In S830, the source Push client generates a Push message on the basis of the Push information and based on the obtained destination user Push identifier, and sends the Push message to a Push server.

Figure 9:
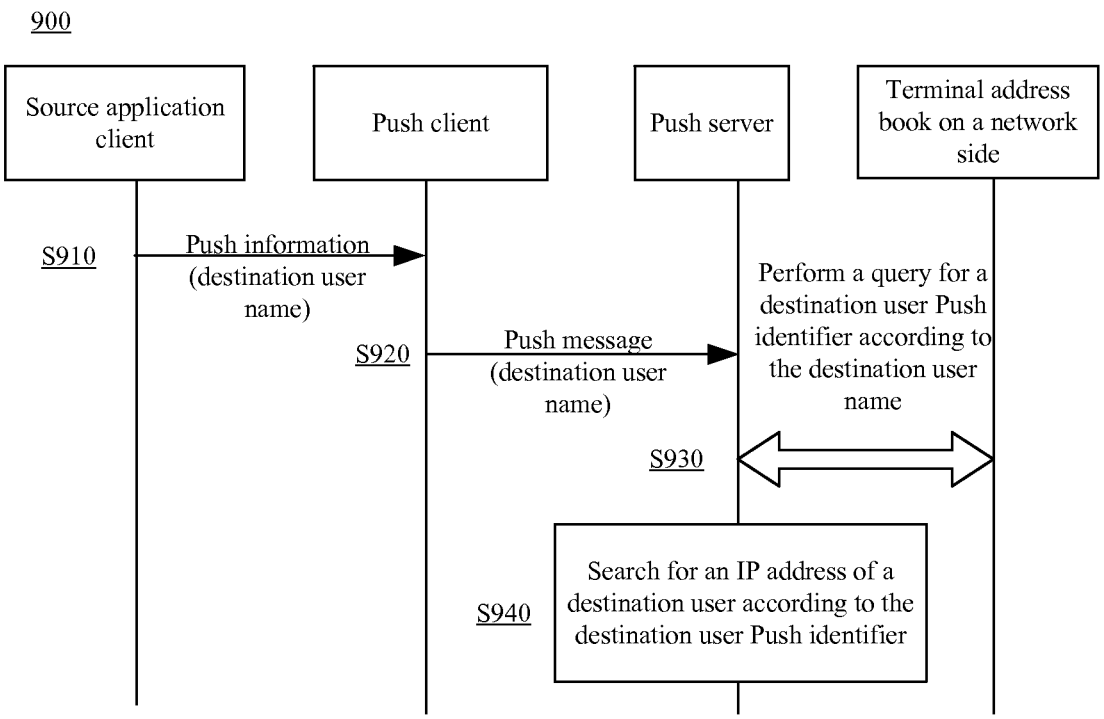
FIG. 9 is a schematic diagram of still another method for obtaining a destination user Push identifier by a Push server according to an embodiment of the present invention.

FIG. 9 is a schematic diagram of a method 900 for obtaining a destination user Push identifier by a Push server according to an embodiment of the present invention.

In S910, a source application client sends Push information to a source Push client, where the Push information carries a user name of a destination user, and the user name may be obtained by the source application client querying an address book.

In S920, the source Push client sends the Push server a Push message that carries the user name of the destination user.

In S930, the Push server queries, according to the user name of the destination user carried in the Push message, a terminal address book that is on a network side, and obtains the destination user Push identifier corresponding to the user name of the destination user.

In S940, according to the destination user Push identifier, the Push server searches for a network address with which the destination user can be reached. Certainly, the Push server may add the destination user Push identifier to the Push message. In this embodiment, although the Push message sent by the source Push client carries the user name of the destination user rather than the destination user Push identifier needed for address translation, the user name of the destination user serves a same function as the destination user Push identifier in uniquely identifying the destination user, with the only difference in the form of expression, and the assistance of the Push server is required to perform further translation. Therefore, from the perspective of a system or from the perspective of the destination user, it may still be deemed that the Push message sent by the source Push client carries the destination user Push identifier.

In addition, a process of obtaining an application identifier may be directly notified to a Push client by an application client, or be notified to the Push client after the application client queries a configuration file that records correspondence between the application identifier and an application, or be obtained by the Push client itself by querying the configuration file. Certainly, the Push client may also query the network side according to the information sent by the application client, to obtain the application identifier.

In embodiments shown in FIG. 4 to FIG. 9 above, the Push server may be a source Push server or a destination Push server, which depends on whether a source Push client of a source user and a destination Push client of a destination user belong to a same Push server.

In conclusion, a manner in which an application client notifies a Push client of at least one of a source user Push identifier, a destination user Push identifier, and an application identifier includes directly transmitting a corresponding identifier in an internal communication manner, may also include that the application client notifies the Push client of identifier-related information, and the Push client itself searches a configuration file locally or queries another entity on a network side. The manner in which the Push client obtains at least one of the three identifiers may be directly obtaining locally, or obtaining by search on the network side. In addition, a source Push server may also query, according to a Push message, a specific network element in the network for a corresponding identifier.

The foregoing process of obtaining any one of the three identifiers may be first performed by the source application client or the source Push client and the obtained identifier may be stored in a device, and may also be performed before the source Push client sends the Push message, and may also be performed by the Push server when the Push message is sent to the Push server.

In the foregoing embodiments of the present invention, Push information that an application client (for example, the application corresponding to the address book) sends to a Push client may be a specific Push message, and may also be Push information sent to the Push server in a manner of parameter invoking (for example, the application client inputs a destination user Push identifier, a local user Push identifier and so on to the Push client as parameters, and the Push client generates a Push message). In the foregoing embodiments, the user name of the destination user is not limited to a name of the user, and may also be information such as a phone number, so long as different users can be differentiated.

In the embodiments of the present invention, after obtaining the source user Push identifier, the destination user Push identifier, or the application identifier, the source Push client may buffer one or any combination of these identifiers in a local user terminal, to facilitate a later query.

In the embodiments of the present invention, the source Push client may directly know a network address of the source Push server, so as to send a Push message to the source Push server; and the source Push client may also know only information such as a domain name of the source Push server, and the source Push client queries a Domain Name System (DNS) system to obtain the network address of the source Push server, so as to send the Push message to the source Push server. In this case, the domain name information or the network address of the source Push server may be stored in the source user terminal, which the source Push client may query directly or according to the source user Push identifier.

The source Push client may not know the network address of the source Push server. In this case, the source Push client may query the network side for the network address of the source Push server, or after the Push message is sent, another network element may send the Push message to the source Push server according to the type of the Push message. For example, the source Push client may configure only a domain name of one Push server statically, and can obtain an address of the Push server according to the domain name; the source Push client sends all Push messages to the Push server; the Push server determines, according to the destination user Push identifier, whether to indirectly forward the Push messages to another Push server, or to perform an address query and then directly send, based on an address obtained through the query, the Push messages to the destination Push client. In addition, in the network architecture shown in FIG. 1, the source Push client needs to send the Push message to the Push server through a data gateway node, but it is not excluded that the source Push client may also send the Push message to the source Push server directly or through an access device such as a base station.

In the embodiments of the present invention, at least one Push server of the source Push server and the destination Push server may authenticate a Push message according to an application identifier carried in the received Push message and judge whether an application corresponding to the application identifier is legally authorized, to prevent an unauthorized application from pushing junk information into transmission in the network. If the authorization is legal, the authenticated Push message is forwarded. For example, the application identifier carried in the Push message may be compared with a legal application identifier list stored in the source Push server; if the same, it is deemed that the application identifier is legally authorized. Because the Push server may authenticate the application identifier, the unauthorized application can be prevented from pushing junk information into transmission in the network, which further saves network resources and guarantees a legal network application environment.

In the embodiments of the present invention, at least one Push server of the source Push server and the destination Push server may also authenticate a destination user Push identifier and/or a source user Push identifier carried in a Push message, so that only a legal destination user and/or source user can perform service communication provided by the embodiments of the present invention. For example, the destination user Push identifier and/or the source user Push identifier carried in the Push message may be compared with a legal user Push identifier stored in the source Push server; if the same, it is deemed that this user is legal. Certainly, the destination user Push identifier and/or the source user Push identifier may also be authenticated by another functional entity, for example, an authentication, authorization, and accounting AAA server or a home subscriber server (HSS).

In the embodiments of the present invention, the deployment of Push servers may be distributed deployment. Users may belong to different servers. A Push server to which each user belongs may be referred to as the home Push server of the user itself. When a home Push server to which the source user belongs (for example, the source Push server) is different from a home Push server to which the destination user belongs (for example, the destination Push server), routing may be performed according to a flag bit carried in a user Push identifier. The flag bit may be mapped to the home Push server of the destination user, so that a Push message is routed between Push servers according to the user Push identifier. That is, in the foregoing embodiments of the present invention, the source Push server may send the Push message to the destination Push server according to a flag bit in the destination user Push identifier.

When a user is in a roaming state, that is, the user moves from a home domain to another domain, a Push message sent to the user first reaches a home Push server to which the user belongs, and then the Push server in the home domain forwards the Push message to a Push server in the roaming domain of the user. That is, sending, by a destination Push server and based on a network address, a Push message to a destination Push client may include that: The destination Push server sends the Push message to a roaming domain Push server in a roaming domain where a destination user is located; and the roaming domain Push server sends, based on the network address, the Push message to the destination Push client. To implement this routing, every time when the user roams to another domain, the user needs to register with a Push server in the roaming domain, and may complete registration with the Push server in the home domain through the Push server in the roaming domain. The Push message sent to the user may be first sent to the home Push server of the user according to a flag bit in a user Push identifier; because the home Push server knows, in a previous registration process, that the user roams to the Push server in the other domain, the home Push server sends the Push message to the Push server in the roaming domain of the user according to recorded correspondence, and the Push server in the roaming domain sends the Push message to the user.

When the roaming user needs to send a Push message, that is, when the roaming user acts as a source user, the Push server in the roaming domain is used to replace the source Push server to which the source user belongs in the instances shown in FIG. 2 to FIG. 10, so as to implement functions such as receiving and forwarding the Push message. That is, a Push message sent by a source Push client may directly reach the Push server in the roaming domain, and the Push server in the roaming domain performs address translation according to a destination user Push identifier, and then sends the Push message to a destination user (in this case, the destination user belongs to the Push server in the roaming domain) or a Push server to which the destination user belongs, without passing through the home Push server of the roaming source user.

For example, the user Push identifier may be formed by a series of binary bits, where the first four bits correspond to routing flat bits and the latter bits are used to differentiate different users. The former two bits of the first four bits may be flag bits of an operator, for example, 00 is used to represent China Mobile, 01 is used to represent China Unicom, and 10 is used to represent China Telecom. The latter two bits of the first four bits may be a sequence number, and are used to indicate a different Push server, for example, 00 represents Push server 1, and 01 represents Push server 2. In this case, if a source Push server with a number 0001 receives a Push message, where routing flag bits in a destination user Push identifier carried in the Push message are 0011, the Push message is first routed to Push server 4 of China Mobile with a number 0011. Therefore, the source Push server determines a destination Push server according to the routing flag bits in the destination user Push identifier, and then obtains a network address of the destination Push server according to a mapping relationship between a Push server and its network address. The mapping relationship between the Push server and its network address may be stored in the source Push server in advance, and may also be stored in another network element in a centralized manner to wait for the source Push server to query.

In the embodiments of the present invention, when a destination Push client receives a Push message, the destination Push client installed in a terminal device of a destination user may enable a prompt mechanism to notify the destination user of the arrival of the Push message. For example, when the destination Push client notifies the user of the arrival of new information, a page window may pop up or a ring tone may be played on the terminal device. Certainly, the destination Push client may also give a prompt in another manner, for example, a manner such as a prompt box, sound, picture, ringing, and vibration.

In the embodiments of the present invention, after receiving the Push message, the destination Push client determines whether an application corresponding to an application identifier carried in the Push message is enabled. If the application is not enabled, the destination Push client starts a corresponding destination application client, that is, invokes or enables the corresponding application. Preferably, after enabling the prompt mechanism, the destination Push client enables the corresponding application in a case that it is determined that the application corresponding to the application identifier is not enabled. The Push client may start the application in a case that the corresponding application is not enabled, so that the application does not need to keep an enabled state and even does not need to keep online all the time, and is enabled only when necessary. Therefore, in the embodiments of the present invention, the power consumption of the terminal can further be saved and the resource utilization in the terminal device can be reduced.

According to the foregoing embodiments of the present invention, in the case that it is determined that the application corresponding to the application identifier is not enabled, the destination Push client first prompts the destination user whether to enable the application, and then enables the application when receiving confirmation information that the destination user confirms enabling the application. Therefore, a service can be shared between users.

A process of enabling or starting the application may include the following cases:

1. In a case that an application identifier carried in a Push message corresponds to specific application software (for example, QQ software, MSN software, and application software integrated into an RCS) and the application software is also installed in a terminal device of a destination user, a destination Push client starts the application software according to the application identifier.

2. In a case that an application identifier carried in a Push message corresponds to specific application software but the application software is not installed in a user device of a destination user, a destination Push client attempt to start similar application software according to the application identifier. For example, the application identifier indicates that Word software is needed, but WordPad software rather than the Word software is installed in the terminal device of the destination user; the destination Push client attempts to start the WordPad software to display text information carried in the Push message.

3. In a case that an application identifier carried in a Push message corresponds to a content attribute of service information, a destination Push client attempts, according to the application identifier, to start application software that can present the service information in the Push message for a destination user. For example, when the application identifier indicates that the service information in the Push message is a picture, the destination Push client starts picture browsing application software in a terminal device of the destination user.

In the embodiments of the present invention, when two communication parties are located behind a network address translation (NAT) device, after receiving a Push message sent by a source user, a destination user may not be capable of communicating with the source user directly. That is because most NATs in an existing network are restricted cone-shaped NATs; this kind of NAT may assist a NAT traversal technology (for example, a User Datagram Protocol (UDP) hole punching technology) in enabling users of both parties to communicate normally. To support a scenario where the two communication parties are located behind the NAT, an operator may deploy an additional server having a public network address, to support the NAT such as a UDP hole punching technology. For example, a function of a Push server may be enhanced to support NAT transversal. For example, when performing address translation between a user Push identifier and a network address, the Push server may perform address translation between the user Push identifier and a combination of a network address and a port number.

In addition, when the Push message is routed between Push servers, a network address carried in the Push message traversing different domains needs to be a public network address after NAT translation.

Figure 10:
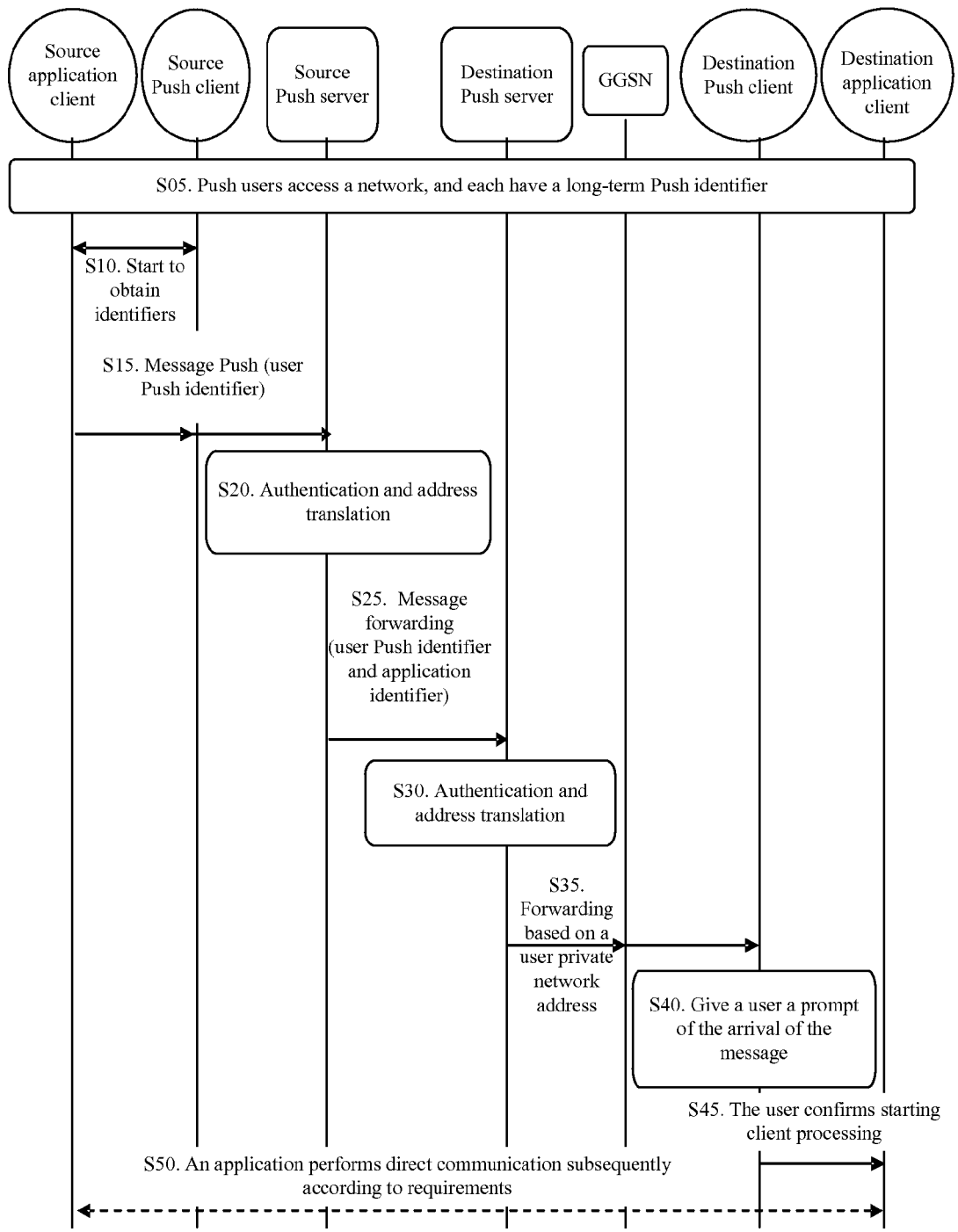
FIG. 10 is a schematic diagram of still another method for service communication according to an embodiment of the present invention.

FIG. 10 is a schematic flowchart of still another method for service communication according to an embodiment of the present invention. As shown in FIG. 10, in S05, users in both communication ends, namely, a source user and a destination user, access a network separately, for example, accessing a packet switched (PS) domain. The users of both ends already know user Push identifiers of each other's peer ends, where a knowing manner may be offline or online, and is similar to a manner in which people know phone numbers of each other in daily life. According to a user Push identifier of a peer end, a terminal may initiate Push-based service communication to another peer end.

In S10, a source application client and a source Push client start a process of obtaining identifiers, where the identifiers include a source user Push identifier, a destination user Push identifier, and an application identifier.

In S15, the source Push client receives service information sent from the source application client, and generates, based on the service information, a Push message that carries the destination user Push identifier for identifying the destination user, where the Push message may further carry the source user Push identifier for identifying the source user and/or the application identifier for identifying a service type. Afterwards, the source Push client sends the generated Push message to a source Push server, where the source Push server includes a Push server to which the source user belongs, or a Push server in a roaming domain where the source user is located.

In S20, the source Push server authenticates the application identifier carried in the received Push message, to prevent an unauthorized application from pushing a junk message, and the source Push server may also authenticate user Push identifiers of both ends. After the Push message is successfully authenticated, the source Push server determines, according to the destination user Push identifier, a destination Push server to which the destination user belongs.

If the source Push server determines, according to the destination user Push identifier carried in the Push message, that the destination Push server to which the destination user belongs is the source Push server itself, that is, if the source Push server and the destination Push server are a same object, the source Push server performs address translation according to the destination user Push identifier, to obtain a network address for reaching a destination Push client, and sends, based on the network address, the Push message to the destination Push client (S35). If the source user and the destination user belong to different Push servers, the source Push server may route, according to a flag bit in the destination user Push identifier, the Push message to the destination Push server to which the destination user belongs (S25).

In S30, similarly, the destination Push server authenticates the application identifier and/or the user Push identifier in the received Push message. After the Push message passes the authentication, the destination Push server performs address translation according to the destination user Push identifier to obtain a current IP address of the destination user, and forwards the Push message to the destination Push client. For example, the destination Push server may obtain a network address of the destination user according to a mapping relationship which is between a user Push identifier and a user network address and is stored in the destination Push server, and may also query, for the network address of the destination user and according to the destination user Push identifier, a specific network element storing the mapping relationship.

In S35, when the network architecture shown in FIG. 1 is adopted, the destination Push server needs to send the Push message to the destination user through a data gateway node. In this case, because an IP address of the destination user is allocated by a destination GGSN, the Push message forwarded by the destination Push server first reaches the destination GGSN, and then the GGSN forwards the Push message to the destination Push client. However, in the embodiment of the present invention, it is not excluded that the destination Push server sends the Push message to the destination user directly or through an access device such as a base station, so long as the Push message forwarded by the destination Push server can reach a terminal device of the destination user.

In S40, the destination Push client gives the destination user a prompt of the arrival of the Push message.

In S45, when the destination Push client determines that an application that can process the Push message is not enabled, the application is enabled after confirmation of the destination user is received, so as to share a service with the source user. Afterwards, the users perform direct communication subsequently according to requirements (S50).

In the method for service communication provided by the embodiment of the present invention, address translation is performed according to the destination user Push identifier carried in the Push message to find the destination user, so that communication between the source user and the destination user can be completed by using a Push identifier, without involving a third party application server. Therefore, according to the method for service communication provided by the embodiment of the present invention, a user neither needs to run the application client all the time nor needs to keep the application online to implement communication, which can save resources of a network and terminal, and reduce the power consumption of the terminal. In addition, due to a Push communication manner without relying on a third party application server, direct communication between users can be implemented, which reduces the maintenance costs of the third party application server, and reduces a communication delay. In this way, in the embodiment of the present invention, through communication in a Push manner, information can be shared between users anytime and anywhere.

Figure 11:
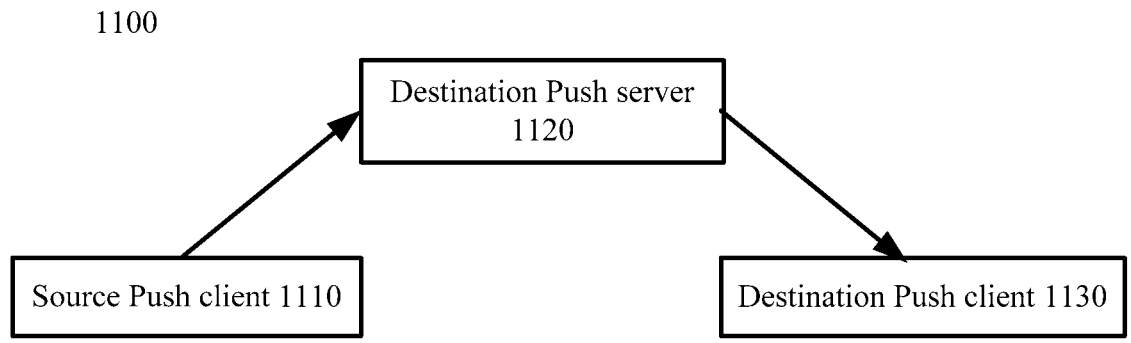
FIG. 11 is a schematic diagram of a system for service communication according to an embodiment of the present invention.
Figure 12:
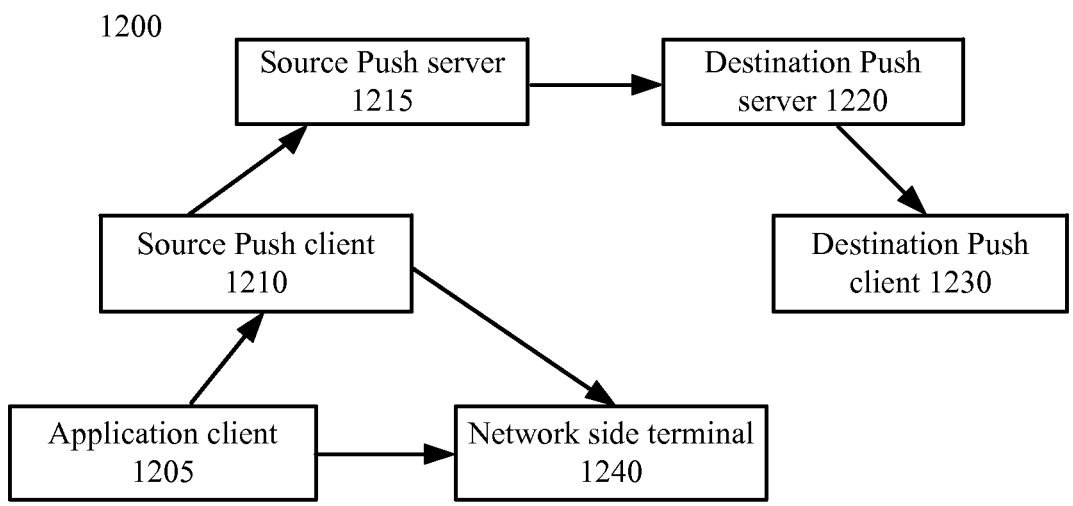
FIG. 12 is a schematic diagram of another system for service communication according to an embodiment of the present invention.

In the following, a system for service communication according to an embodiment of the present invention is described. FIG. 11 is a schematic diagram of a system for service communication 1100 according to an embodiment of the present invention, and FIG. 12 is a schematic diagram of another system for service communication 1200 according to an embodiment of the present invention.

As shown in FIG. 11, the system 1100 includes a source Push client 1110, a destination Push server 1120, and a destination Push client 1130.

The source Push client 1110 may generate a Push message, where the Push message carries a destination user Push identifier for identifying a destination user, and the source Push client 1110 may send the generated Push message to a destination Push server 1120 to which the destination user belongs. The destination Push server 1120 may obtain, according to the destination user Push identifier, a network address for reaching the destination Push client 1130, and send, based on the network address, the Push message to the destination Push client 1130.

For the foregoing and other operations and/or functions of the source Push client 1110, the destination Push server 1120, and the destination Push client 1130, reference may be made to corresponding descriptions in the foregoing method 200 to method 1000, and to avoid repetition, no detail is described again herein.

According to the system for service communication provided by the embodiment of the present invention, the destination Push server performs an address query according to the destination user Push identifier carried in the Push message, to find the destination user, so that communication between the source user and the destination user can be completed by using a Push identifier, without involving a third party application server. Therefore, in the embodiment of the present invention, communication of various services can still be established without relying on a third party application server, so that a user avoids keeping an application online all the time or querying the server periodically, and meanwhile, still can obtain, in real time, a message or content sent by a peer end of the communication. Therefore, in the embodiment of the present invention, the power consumption of the terminal can be reduced and network resources can be saved.

As shown in FIG. 12, the system 1200 may include a source Push client 1210, a destination Push server 1220, and a destination Push client 1230. The source Push client 1210, the destination Push server 1220, and the destination Push client 1230 of the system 1200 are basically the same as the source Push client 1110, the destination Push client 1120, and the destination Push client 1130 of the system 1100.

The system 1200 may further include a source Push server 1215. When the source Push server 1215 is different from the destination Push server 1220, the source Push client 1210 sends a Push message to the source Push server 1215; and the source Push server 1215 sends, according to a destination user Push identifier, the Push message to the destination Push server 1220 to which a destination user belongs, where the source Push server may include a Push server to which a source user belongs, and may also include a Push server in a roaming domain where the source user is located.

According to the embodiment of the present invention, the Push message may further carry a source user Push identifier for identifying the source user and/or an application identifier for identifying a service type.

In the embodiment of the present invention, the system 1200 may further include an application client 1205. Service information received by the source Push client 1220 may come from the application client 1205. The application client 1205 may include one or multiple of the following sets: an address book that can communicate with the source Push client, a third party application client, a proxy client, and an RCS.

In the embodiment of the present invention, at least one of the application client 1205 and the source Push client 1210 may obtain the destination user Push identifier carried in the Push message by querying a source user terminal. That is, the destination user Push identifier, the source user Push identifier, or the application identifier carried in the Push message may be obtained by the application client or the source Push client by querying the source user terminal.

In addition, the destination user Push identifier, the source user Push identifier, or the application identifier carried in the Push message may be obtained by the application client 1205 by directly querying a related mapping relationship stored in the application client 1205.

In the embodiment of the present invention, the system 1200 may further include a network side device 1240 (the network side device 1240 shown in FIG. 12 is a network side terminal 1240). The destination user Push identifier, the source user Push identifier, or the application identifier carried in the Push message may be obtained by the application client 1205 or the source Push client 1210 by querying the network side device 1240. The network side device 1240 may be an existing network element or a newly added network element, in which correspondence between a user Push identifier and a user or correspondence between an application identifier and an application is stored. For example, the network side device 1240 may be a terminal address book of the network side device that stores the correspondence between the user Push identifier and the user, and the network side device 1240 may also be a Push server that stores the correspondence between the application identifier and the application.

In the embodiment of the present invention, the destination Push server 1220 may authenticate the application identifier carried in the Push message, and send, based on the network address, the authenticated Push message to the destination Push client 1230. By authenticating the application identifier, an unauthorized junk Push message can be prevented from passing through a network, which can save network resources and maintain the network environment.

Similarly, the destination Push server 1220 may also authenticate the destination user Push identifier and/or the source user Push identifier carried in the Push message, and send, based on the network address, the authenticated Push message to the destination Push client 1230. By authenticating the user Push identifiers, it can be guaranteed that only legal and authorized users can perform communication.

In the embodiment of the present invention, when the source user and the destination user belong to different Push servers, that is, when the source Push server is different from the destination Push server, the source Push server 1215 shown in FIG. 12 may send the Push message to the destination Push server 1220 according to a flag bit in the destination user Push identifier. In this case, the source Push server 1215 may first determine, based on the flag bit in the destination user Push identifier, that the source Push server 1215 itself is not the destination Push server, and then query, according to the flag bit, a network address of a Push server that corresponds to the flag bit and is stored in the source Push server 1215 or a specific network element, that is, a network address of the destination Push server 1220; and then, sends the Push message to the destination Push server 1220 according to the network address of the destination Push server 1220.

In the embodiment of the present invention, when a user is in a roaming state, that is, the user moves from a home domain to another domain, the system for service communication according to the embodiment of the present invention may further include a roaming domain Push server in a roaming domain where the destination user is located; the destination Push server sends the Push message to the roaming domain Push server; the roaming domain Push server sends, based on the network address, the Push message to the destination Push client.

In the embodiment of the present invention, the destination Push client 1230 may give the destination user a prompt of the arrival of the Push message after receiving the Push message. The destination Push client may give the prompt in a manner such as a prompt box, sound, picture, and vibration. After the destination Push client 1230 receives the Push message, and in a case that it is determined that an application corresponding to the application identifier is not enabled, the destination Push client 1230 enables the application. In a process of enabling the application, preferably, when it is determined that the application corresponding to the application identifier is not enabled, the destination Push client 1230 may first prompt the destination user whether to enable the application, and then enable the application when receiving confirmation information that the destination user confirms enabling the application.

For the foregoing and other operations and/or functions of the application client 1205, the source Push client 1210, the source Push server 1215, the destination Push server 1220, the destination Push client 1230, and the network side device 1240 of the system 1200, reference may be made to corresponding descriptions in the foregoing method 200 to method 1000, and to avoid repetition, no detail is described again herein.

In the system for service communication provided by the embodiment of the present invention, the destination Push server performs address translation according to the destination user Push identifier carried in the Push message, to find a destination user, so that communication between the source user and the destination user can be implemented by using the Push identifier, without involving a third party application server. Because a user neither needs to run the application client all the time nor needs to keep the application online to implement communication, in the embodiment of the present invention, resources of a network and terminal can be saved, and the power consumption of the terminal can be reduced. In addition, in the embodiment of the present invention, direct communication between users is implemented in a Push communication manner without relying on a third party application server, which can reduce the maintenance costs of the third party application server, and reduce a communication delay. In this way, information can be shared between users anytime and anywhere.

In addition, because the Push server may authenticate the application identifier, an unauthorized application can be prevented from pushing junk information into transmission in the network, which further saves network resources and guarantees a legal network application environment. In another aspect, the Push server may authenticate the user Push identifier, which can ensure the legality of the identity of a Push user and prevent an illegal user from using this Push service. In addition, the Push client can start the application in a case that the corresponding application is not enabled, so that the application does not need to keep an enabled state and even does not need to keep online all the time, and is enabled only when necessary. Therefore, the power consumption of the terminal can be reduced, and the resource utilization in the terminal device can be reduced.

Figure 13:
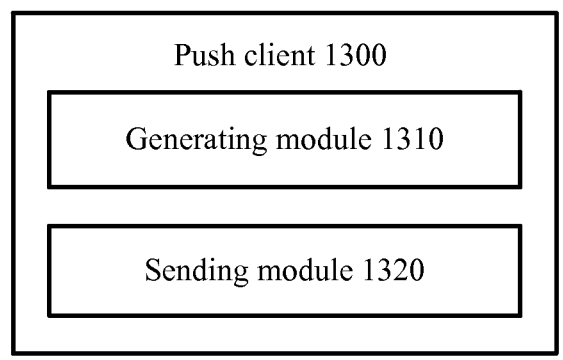
FIG. 13 is a structural block diagram of a Push client for service communication according to an embodiment of the present invention.

In the following, a Push client for service communication according to an embodiment of the present invention is described. FIG. 13 is a structural block diagram of a Push client for service communication 1300 according to an embodiment of the present invention.

The Push client 1300 may include a generating module 1310 and a sending module 1320. The generating module 1310 may be configured to generate a Push message, where the Push message carries a destination user Push identifier for identifying a destination user. The sending module 1320 may be configured to send the Push message, generated by the generating module 1310, to a destination Push server to which the destination user belongs, so that the destination Push server obtains, according to the destination user Push identifier, a network address for reaching a destination Push client, and the destination Push server sends, based on the network address, the Push message to the destination Push client.

For the foregoing and other operations and/or functions of the generating module 1310 and the sending module 1320, reference may be made to corresponding parts of the foregoing method 200 to method 1000, and to avoid repetition, no detail is described again herein.

According to the Push client for service communication provided by the embodiment of the present invention, the Push client carries the destination user Push identifier in the Push message, so that the destination Push server can perform address translation according to the destination user Push identifier carried in the Push message, to find the destination user, so that communication between the source user and the destination user can be completed by using the Push identifier, without involving a third party application server. Therefore, in the embodiment of the present invention, communication of various services can still be established without relying on a third party application server, so that a user avoids keeping an application online all the time or querying the server periodically, and meanwhile, still can obtain, in real time, a message or content sent by a peer end of the communication. Therefore, in the embodiment of the present invention, the power consumption of the terminal can be reduced and network resources can be saved.

Figure 14:
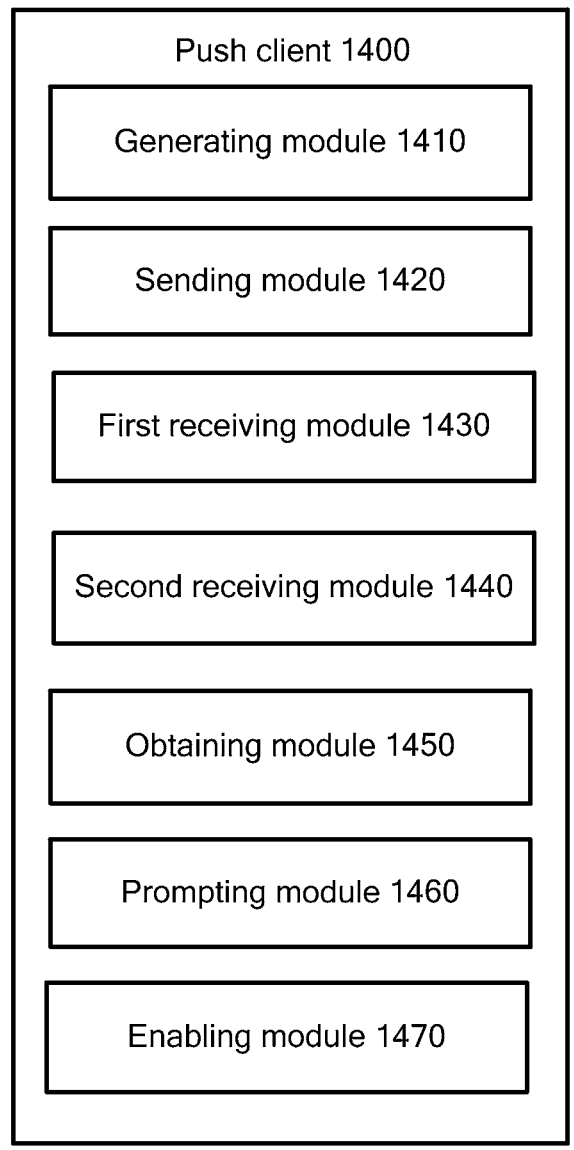
FIG. 14 is another structural block diagram of a Push client for service communication according to an embodiment of the present invention.

FIG. 14 is another structural block diagram of a Push client for service communication 1400 according to an embodiment of the present invention.

The Push client 1400 may include a generating module 1410 and a sending module 1420. The generating module 1410 may be configured to generate a Push message, where the Push message carries a destination user Push identifier for identifying a destination user. The sending module 1420 may be configured to send the Push message, generated by the generating module 1410, to a destination Push server to which the destination user belongs, so that the destination Push server obtains, according to the destination user Push identifier, a network address for reaching a destination Push client, and the destination Push server sends, based on the network address, the Push message to the destination Push client. The generating module 1410 and the sending module 1420 of the Push client 1400 are basically the same as the generating module 1310 and the sending module 1430 of the Push client 1300.

In the embodiment of the present invention, that the sending module 1420 is configured to send the Push message, generated by the generating module 1410, to the destination Push server to which the destination user belongs may include that: the sending module 1420 is configured to send the Push message, generated by the generating module 1410, to a source Push server, so that the source Push server sends, according to the destination user Push identifier, the Push message to the destination Push server to which the destination user belongs, where the source Push server may include a Push server to which a source user belongs, or a roaming domain Push server in a roaming domain where the source user is located.

The Push client 1400 may further include a first receiving module 1430. The first receiving module 1430 may be configured to receive a Push message that the destination Push server sends based on the network address.

The Push client 1400 may further include a second receiving module 1440. The second receiving module 1440 may be configured to receive service information from an application client, where the application client may include one or more of the following: an address book that has a Push interface for communication with the Push client 1400, a third party application client, a proxy client, and an RCS. In addition, the generating module 1410 may generate a Push message based on the service information received by the second receiving module 1440.

The Push client 1400 may further include an obtaining module 1450. The obtaining module 1450 may be configured to obtain one or more of the destination user Push identifier, a source user Push identifier for identifying the source user, and an application identifier for identifying a service type, where the generating module 1410 may generate the Push message according to the destination user Push identifier, the source user Push identifier, and the application identifier which are obtained by the obtaining module 1450.

According to the embodiment of the present invention, the obtaining module 1450 may be configured to obtain the destination user Push identifier, the source user Push identifier, or the application identifier by querying a source user terminal. The obtaining module 1450 may be further configured to obtain the destination user Push identifier, the source user Push identifier, or the application identifier from the application client, where the destination user Push identifier, the source user Push identifier, or the application identifier is obtained by the application client by querying the source user terminal, or obtained by the application client by directly querying a related mapping relationship stored in the application client, or obtained by the application client by querying a network side device. The obtaining module 1450 may be further configured to obtain the destination user Push identifier, the source user Push identifier, or the application identifier by querying the network side device.

The Push client 1400 may further include a prompting module 1460. The prompting module 1460 is configured to: after the first receiving module 1430 receives the Push message, give the destination user a prompt of the arrival of the Push message.

The Push client 1400 may further include an enabling module 1470. The enabling module 1470 may be configured to: after the first receiving module 1430 receives the Push message, and in a case that it is determined that an application corresponding to the application identifier is not enabled, enable the application. For example, the enabling module 1470 may be configured to: in the case that it is determined that the application corresponding to the application identifier is not enabled, first prompt the destination user whether to enable the application, and then enable the application in a case of receiving confirmation information that the destination user confirms enabling the application.

For the foregoing and other operations and/or functions of the generating module 1410, the sending module 1420, the first receiving module 1430, the second receiving module 1440, the obtaining module 1450, the prompting module 1460, and the enabling module 1470 of the Push client 1400, reference may be made to the corresponding parts of the foregoing method 200 to method 1000, and to avoid repetition, no detail is described again herein.

According to the Push client for service communication provided by the embodiment of the present invention, the Push client carries the destination user Push identifier in the Push message, so that the destination Push server can perform address translation according to the destination user Push identifier carried in the Push message, to find the destination user, so that communication between the source user and the destination user can be completed by using the Push identifier, without involving a third party application server. Therefore, in the embodiment of the present invention, the power consumption of the terminal can be reduced and network resources can be saved. In addition, when receiving a Push message, the enabling module does not enable the application unless it finds that the corresponding application is not enabled. Therefore, a user neither needs to run the application client all the time nor needs to keep the application online to implement communication, which can further save resources of a network and terminal, and reduce the power consumption of the terminal. The Push client performs service communication through a process of interaction with a Push server, without relying on a third party application server, which implements direct communication between users, reduces maintenance costs of the third party application server, and reduces a communication delay. Moreover, users communicate with each other in a Push manner with the assistance of the Push client, so that information can be shared between the users anytime and anywhere.

Figure 15:
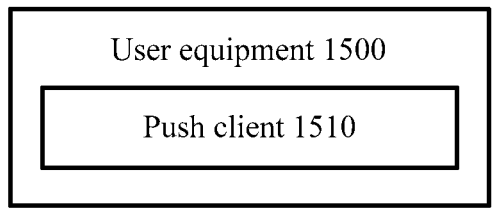
FIG. 15 is a structural block diagram of a user equipment for service communication according to an embodiment of the present invention.

FIG. 15 is a structural block diagram of a user equipment for service communication 1500 according to an embodiment of the present invention.

As shown in FIG. 15, the user equipment 1500 includes the Push client 1510. The user equipment 1500 may generate, with the assistance of the Push client 1510, a Push message that carries a destination user Push identifier, so that a destination Push server may perform an address query according to the destination user Push identifier carried in the Push message, to find a destination user, so that communication between a source user and the destination user can be completed by using a Push identifier, without involving a third party application server, thereby facilitating the communication between the two communication parties. In addition, the Push client 1510 in the user equipment 1500 has an enabling module, which, when receiving a Push message, does not enable an application unless it finds that the corresponding application is not enabled. Therefore, a user neither needs to run the application client all the time nor needs to keep the application online to implement communication, which saves resources of a network and terminal, and reduces the power consumption of the user equipment 1500. The Push client 1510 in the user equipment 1500 performs service communication through a process of interaction with a Push server, without relying on a third party application server, which implements direct communication between users, reduces maintenance costs of the third party application server, and reduces a communication delay. In addition, users communicate with each other in a Push manner with the assistance of the user equipment 1500 that has the Push client 1510, so that information can be shared between the users anytime and anywhere.

Those skilled in the art may be aware that the steps of the methods and units described in the embodiments disclosed in this document may be implemented by electronic hardware, computer software, or a combination of the two. In order to specify clearly the interchangeability of the hardware and software, the steps and components of each embodiment are described generally according to the functions in the foregoing specification. Whether the functions are executed by hardware or software depends on particular applications and design constraint conditions of the technical solutions. Those skilled in the art may use different methods to implement the described functions for each specific application, but this implementation should not be deemed as exceeding the protection scope of the present invention.

The steps of the method described in the embodiments disclosed in this document can be implemented by hardware, a software program executed by a processor, or a combination of the two. The software program may reside in a random access memory (RAM), a memory, a read-only memory (ROM), an electrically programmable ROM, an electrically erasable programmable ROM, a register, a hard disk, a removable disk, a compact disc read-only memory (CD-ROM), or any other form of storage medium well known in the art.

Although some embodiments of the present invention are shown and described, those skilled in the art should understand that, various modifications can be made to these embodiments without departing from the principle and the spirit of the present invention, and such modifications fall within the scope of the present invention.

What is claimed is:

1. A method for service communication comprising:
generating, by a source Push client, a Push message, wherein the Push message carries a destination user Push identifier for identifying a destination user; and
sending, by the source Push client, the Push message to a source Push server;
based on a flag bit in the destination user Push identifier, sending, by the source Push server, the Push message to a destination Push server to which the destination user belongs such that the destination Push server obtains, according to the destination user Push identifier, a network address for reaching a destination Push client; and
sending, by the destination Push server, the Push message to the destination Push client based on the network address.

2. The method according to claim 1, wherein sending the Push message to the destination Push server comprises sending the Push message according to the destination user Push identifier.

3. The method according to claim 2, wherein the source Push server comprises a Push server to which a source user belongs or a roaming domain Push server in a roaming domain where the source user is located.

4. The method according to claim 1, wherein generating, by the source Push client, the Push message comprises generating, by the source Push client, the Push message based on service information received from an application client, wherein the application client comprises one or more of: an address book that can communicate with the source Push client, a third party application client, a proxy client, and a rich communication suite (RCS).

5. The method according to claim 4, wherein the Push message further carries a source user Push identifier for identifying a source user and/or an application identifier for identifying a service type.

6. The method according to claim 5, wherein the destination user Push identifier, the source user Push identifier, or the application identifier carried in the Push message is obtained by the application client or the source Push client by querying a source user terminal.

7. The method according to claim 5, wherein the destination user Push identifier, the source user Push identifier, or the application identifier carried in the Push message is obtained by the application client by directly querying a related mapping relationship stored in the application client.

8. The method according to claim 5, wherein the destination user Push identifier, the source user Push identifier, or the application identifier carried in the Push message is obtained by the application client or the source Push client by querying a network side device.

9. The method according to claim 5, wherein sending, by the destination Push server, the Push message to the destination Push client comprises:
   authenticating, by the destination Push server, the application identifier carried in the Push message; and
   sending, by the destination Push server, the authenticated Push message to the destination Push client based on the network address.

10. The method according to claim 5, wherein sending, by the destination Push server, the Push message to the destination Push client comprises:
    authenticating, by the destination Push server, the destination user Push identifier and the source user Push identifier that are carried in the Push message; and
    sending, by the destination Push server, the authenticated Push message to the destination Push client based on the network address.

11. The method according to claim 1, wherein sending, by the destination Push server, the Push message to the destination Push client comprises:
    sending, by the destination Push server, the Push message to a roaming domain Push server in a roaming domain where the destination user is located; and
    sending, by the roaming domain Push server, the Push message to the destination Push client based on the network address.

12. A system for service communication comprising:
    a source Push client;
    a destination Push client;
    a source Push server; and
    a destination Push server,
    wherein the source Push client generates a Push message,
    wherein the Push message carries a destination user Push identifier for identifying a destination user,
    wherein the source Push client sends the Push message to the source Push server and, based on a flag bit in the destination user Push identifier, the source Push server sends the Push message to the destination Push server to which the destination user belongs,
    wherein the destination Push server obtains, according to the destination user Push identifier, a network address for reaching the destination Push client, and
    wherein the destination Push server sends, based on the network address, the Push message to the destination Push client.

13. The system according to claim 12, wherein the source Push server sends the Push message to the destination Push server according to the destination user Push identifier.

14. The system according to claim 13, wherein the source Push server comprises a Push server to which a source user belongs or a roaming domain Push server in a roaming domain where the source user is located.

15. The system according to claim 12, wherein the system further comprises an application client, wherein the source Push client generates a Push message based on service information received from the application client, and wherein the application client comprises one or more of: an address book that can communicate with the source Push client, a third party application client, a proxy client, and a rich communication suite (RCS).

16. The system according to claim 15, wherein the Push message further carries a source user Push identifier for identifying a source user and/or an application identifier for identifying a service type.

17. The method according to claim 16, wherein the destination user Push identifier, the source user Push identifier, or the application identifier carried in the Push message is obtained by the application client or the source Push client by querying a source user terminal.

18. The system according to claim 16, wherein the destination user Push identifier, the source user Push identifier, or the application identifier carried in the Push message is obtained by the application client by directly querying a related mapping relationship stored in the application client.

19. The system according to claim 16, wherein the system further comprises a network side device, and wherein the destination user Push identifier, the source user Push identifier, or the application identifier carried in the Push message is obtained by the application client or the source Push client by querying the network side device.

20. The system according to claim 16, wherein the destination Push server authenticates the application identifier carried in the Push message, and sends, based on the network address, the authenticated Push message to the destination Push client.

21. The system according to claim 16, wherein the destination Push server authenticates the destination user Push identifier and the source user Push identifier that are carried in the Push message, and sends, based on the network address, the authenticated Push message to the destination Push client.

22. The system according to claim 12, wherein the system further comprises a roaming domain Push server in a roaming domain where the destination user is located, wherein the destination Push server sends the Push message to the roaming domain Push server, and wherein the roaming domain Push server sends, based on the network address, the Push message to the destination Push client.

23. The system according to claim 12, wherein after receiving the Push message, the destination Push client gives the destination user a prompt of arrival of the Push message.

24. The system according to claim 12, wherein after the destination Push client receives the Push message, in a case that it is determined that an application corresponding to the application identifier is not enabled, the destination Push client enables the application.

25. The system according to claim 24, wherein in the case that it is determined that the application corresponding to the application identifier is not enabled, the destination Push client first prompts the destination user whether to enable the application, and then enables the application when receiving confirmation information that the destination user confirms enabling the application.

26. A Push client for service communication comprising:
    a processor; and
    a machine-readable storage medium coupled to the processor, the machine-readable storage medium including instructions that, when executed by the processor, cause the processor to:
      generate a Push message, wherein the Push message carries a destination user Push identifier for identifying a destination user,
      send the Push message to a destination Push server to which the destination user belongs such that the destination Push server obtains, according to the destination user Push identifier, a network address for reaching a destination Push client, and wherein the destination Push server sends, based on the network address, the Push message to the destination Push client;

determine whether an application corresponding to an application identifier in the Push message is enabled, the application identifier identifying a service type;

upon a determination that the application is not enabled, enable the application;

obtain the destination user Push identifier, a source user Push identifier for identifying a source user, and the application identifier;

generate the Push message according to one or more of the destination user Push identifier, the source user Push identifier, and the application identifier; and obtain the destination user Push identifier, the source user Push identifier, and the application identifier by querying a source user terminal.

27. A Push client for service communication comprising:
a processor; and
a machine-readable storage medium coupled to the processor, the machine-readable storage medium including instructions that when executed by the processor, cause the processor to:

generate a Push message, wherein the Push message carries a destination user Push identifier for identifying a destination user;

send the Push message to a destination Push server to which the destination user belongs such that the destination Push server obtains, according to the destination user Push identifier, a network address for reaching a destination Push client, and wherein the destination Push server sends, based on the network address, the Push message to the destination Push client;

determine whether an application corresponding to an application identifier in the Push message is enabled, the application identifier identifying a service type;

upon a determination that the application is not enabled, enable the application;

obtain the destination user Push identifier, a source user Push identifier for identifying a source user, and the application identifier;

generate the Push message according to one or more of the destination user Push identifier, the source user Push identifier, and the application identifier; and obtain the destination user Push identifier, the source user Push identifier, and the application identifier by querying a network side device.

* * * * *